US011469987B2

(12) United States Patent
Lim et al.

(10) Patent No.: US 11,469,987 B2
(45) Date of Patent: Oct. 11, 2022

(54) INCREMENTAL AND PARALLEL ROUTING DOMAIN COMPUTATION

(71) Applicant: VMware, Inc., Palo Alto, CA (US)

(72) Inventors: Harold Vinson Chao Lim, Union City, CA (US); Wei Guo, Santa Clara, CA (US); Jui Yi Kao, Palo Alto, CA (US); Leonid Ryzhyk, Mountain View, CA (US); Jiayu Yu, Mountain View, CA (US)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 17/037,741

(22) Filed: Sep. 30, 2020

(65) Prior Publication Data

US 2022/0103455 A1 Mar. 31, 2022

(51) Int. Cl.
*H04L 45/02* (2022.01)
*H04L 41/082* (2022.01)
*H04L 41/0893* (2022.01)

(52) U.S. Cl.
CPC ............ *H04L 45/02* (2013.01); *H04L 41/082* (2013.01); *H04L 41/0893* (2013.01)

(58) Field of Classification Search
CPC .... H04L 45/02; H04L 41/082; H04L 41/0893
See application file for complete search history.

(56) References Cited

U.S. PATENT DOCUMENTS

| 9,432,259 B1* | 8/2016 | Hutz ..................... H04L 45/28 |
| 9,755,965 B1 | 9/2017 | Yadav et al. |
| 10,103,902 B1 | 10/2018 | Sampath et al. |
| 10,243,846 B2 | 3/2019 | Jiang et al. |
| 10,757,004 B2 | 8/2020 | Wan et al. |
| 2005/0152286 A1* | 7/2005 | Betts ..................... H04L 45/04 370/255 |
| 2006/0034302 A1 | 2/2006 | Peterson |
| 2008/0008202 A1 | 1/2008 | Terrell et al. |

(Continued)

OTHER PUBLICATIONS

Yingya Guo et al., "Traffic Engineering in SDN/OSPF Hybrid Network", IEEE 22nd International Conference on Network Protocols, 2014, pp. 563-568.

(Continued)

*Primary Examiner* — Michael A Keller
*Assistant Examiner* — Jsing Forng Lin
(74) *Attorney, Agent, or Firm* — Su IP Consulting

(57) ABSTRACT

Example methods and systems for routing domain computation are described. In one example, a computer system may assign multiple logical entities with respective routing domain identifiers (IDs) by processing network topology information using multiple compute nodes. In response to detecting a network topology change associated with a particular logical entity, the computer system may determine first state change information identifying a first update to first state information maintained by a first compute node; and second state change information identifying a second update to second state information maintained by a second compute node. Further, the particular logical entity with an updated routing domain ID based on the first state change information and the second state change information. The updated routing domain ID may be used in a communication between a management entity and host(s) supporting the particular logical entity.

21 Claims, 10 Drawing Sheets

(56) References Cited

U.S. PATENT DOCUMENTS

| | | |
|---|---|---|
| 2009/0316702 A1 | 12/2009 | Knees et al. |
| 2011/0142053 A1 | 6/2011 | Van Der Merwe et al. |
| 2013/0058346 A1 | 3/2013 | Sridharan et al. |
| 2013/0223287 A1 | 8/2013 | Ahmad |
| 2014/0075002 A1 | 3/2014 | Pradhan et al. |
| 2014/0101335 A1 | 4/2014 | Filsfils et al. |
| 2014/0146817 A1 | 5/2014 | Zhang |
| 2015/0009808 A1 | 1/2015 | Bejerano et al. |
| 2015/0010001 A1 | 1/2015 | Duda et al. |
| 2015/0058968 A1 | 2/2015 | Wang et al. |
| 2015/0063364 A1 | 3/2015 | Thakkar et al. |
| 2015/0081863 A1 | 3/2015 | Garg et al. |
| 2015/0117216 A1* | 4/2015 | Anand ............... H04L 41/0893 370/236 |
| 2015/0263946 A1 | 9/2015 | Tubaltsev et al. |
| 2015/0304117 A1 | 10/2015 | Dong et al. |
| 2016/0173338 A1 | 6/2016 | Molting |
| 2016/0285760 A1 | 9/2016 | Dong et al. |
| 2016/0301603 A1* | 10/2016 | Park ........................ H04L 41/12 |
| 2017/0048110 A1* | 2/2017 | Wu ......................... H04L 41/12 |
| 2017/0048129 A1 | 2/2017 | Masurekar et al. |
| 2017/0170990 A1 | 6/2017 | Gaddehosur et al. |
| 2017/0358111 A1 | 12/2017 | Madsen |
| 2018/0041470 A1 | 2/2018 | Schultz et al. |
| 2018/0069754 A1 | 3/2018 | Dasu et al. |
| 2018/0302314 A1* | 10/2018 | Wan ........................ H04L 41/12 |
| 2020/0382407 A1 | 12/2020 | Wan et al. |
| 2021/0011780 A1* | 1/2021 | Wan ....................... G06F 9/5083 |
| 2021/0051091 A1* | 2/2021 | Joseph ................... H04L 69/14 |

OTHER PUBLICATIONS

Xin Jin et al., "Dynamic Scheduling of Network Updates", SIGCOMM'14, Aug. 17-22, 2014, 12 pages, ACM.
International Search Report and Written Opinion of the International Searching Authority, International application No. PCT/US2018/027392, dated Jul. 4, 2018.

* cited by examiner

INCREMENTAL AND PARALLEL ROUTING DOMAIN COMPUTATION

BACKGROUND

Virtualization allows the abstraction and pooling of hardware resources to support virtual machines in a Software-Defined Networking (SDN) environment, such as a Software-Defined Data Center (SDDC). For example, through server virtualization, virtualization computing instances such as virtual machines (VMs) running different operating systems may be supported by the same physical machine (e.g., referred to as a "host"). Each VM is generally provisioned with virtual resources to run an operating system and applications. The virtual resources may include central processing unit (CPU) resources, memory resources, storage resources, network resources, etc.

Further, through virtualization of networking services, logical networks may be provisioned, changed, stored, deleted and restored programmatically without having to reconfigure the underlying physical hardware architecture. A logical network may include any suitable number of logical entities, such as logical switches to provide logical layer-2 connectivity and logical routers to provide logical layer-3 connectivity. In practice, routing domain computation may be performed to facilitate traffic forwarding among VMs, as well as control and management of the logical entities. However, it may be challenging to perform routing domain computation efficiently, especially as the size of a logical network increases.

DETAILED DESCRIPTION

Figure 1:
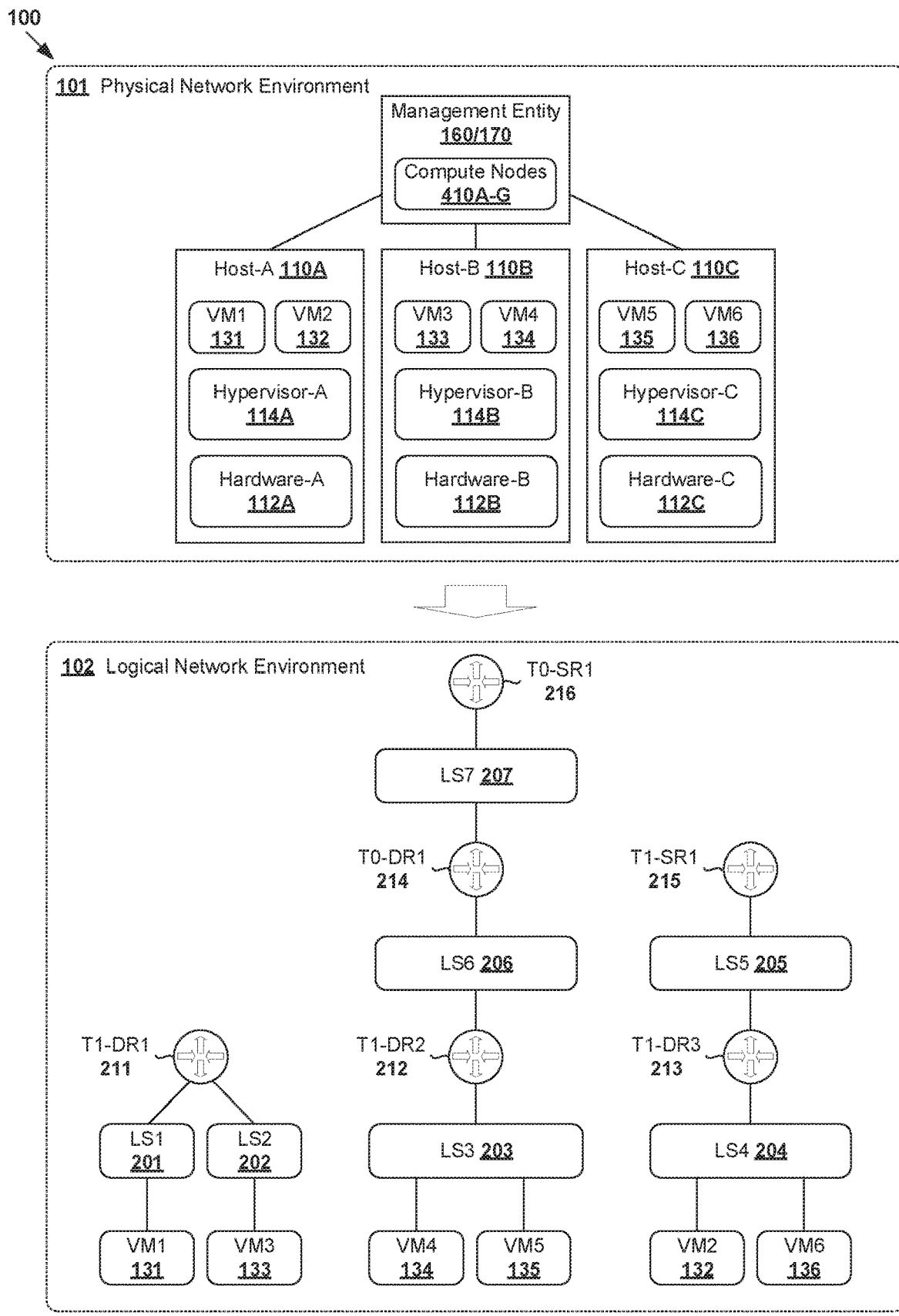
FIG. 1 is a schematic diagram illustrating an example software-defined networking (SDN) environment in which routing domain computation may be performed.

According to examples of the present disclosure, routing domain computation may be implemented in a more efficient manner by distributing computation workload among multiple compute nodes. For example, each compute node may be assigned with a subset of routing domain computation tasks and maintain its own state information. According to an incremental approach, each compute node may maintain its own state information and perform incremental update(s) based on topology change(s) to logical network environment 102. According to a parallel approach, at least some compute nodes may operate in parallel and independently of each other. Various examples will be discussed below.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein. Although the terms "first," "second" and so on are used to describe various elements, these elements should not be limited by these terms. These terms are used to distinguish one element from another. A first element may be referred to as a second element, and vice versa.

Challenges relating to routing domain computation will now be explained in more detail using FIG. 1, which is a schematic diagram illustrating example software-defined networking (SDN) environment 100 in which routing domain computation may be performed. Depending on the desired implementation, SDN environment 100 may include additional and/or alternative components than that shown in FIG. 1. Two views of SDN environment 100 are shown in FIG. 1. According to a physical network environment view (see 101), SDN environment 100 includes management entity 160/170 and multiple physical hosts, such as host-A 110A, host-B 110B and host-C 110C. According to a logical network environment view (see 102), SDN environment 100 includes logical switches (see 201-207) and logical routers (see 211-216) connecting various virtual machines (VMs) 131-136 supported by hosts 110A-C.

(a) Physical Network Environment

Referring first to physical network environment 101, each host 110A/110B/110C may include suitable hardware 112A/112B/112C and virtualization software (e.g., hypervisor-A 114A, hypervisor-B 114B, hypervisor-C 114C) to support various virtual machines (VMs) 131-136. For example, host-A 110A supports VM1 131 and VM2 132; host-B 110B supports VM3 133 and VM4 134; and host-C 110C supports VM5 135 and VM6 136. Hypervisor 114A/114B/114C maintains a mapping between underlying hardware 112A/112B/112C and virtual resources allocated to respective VMs 131-136. In practice, SDN environment 100 may include any number of hosts (also known as host computers", "host devices", "physical servers", "server systems", "transport nodes," etc.), where each host may be supporting tens or hundreds of VMs.

Figure 2:
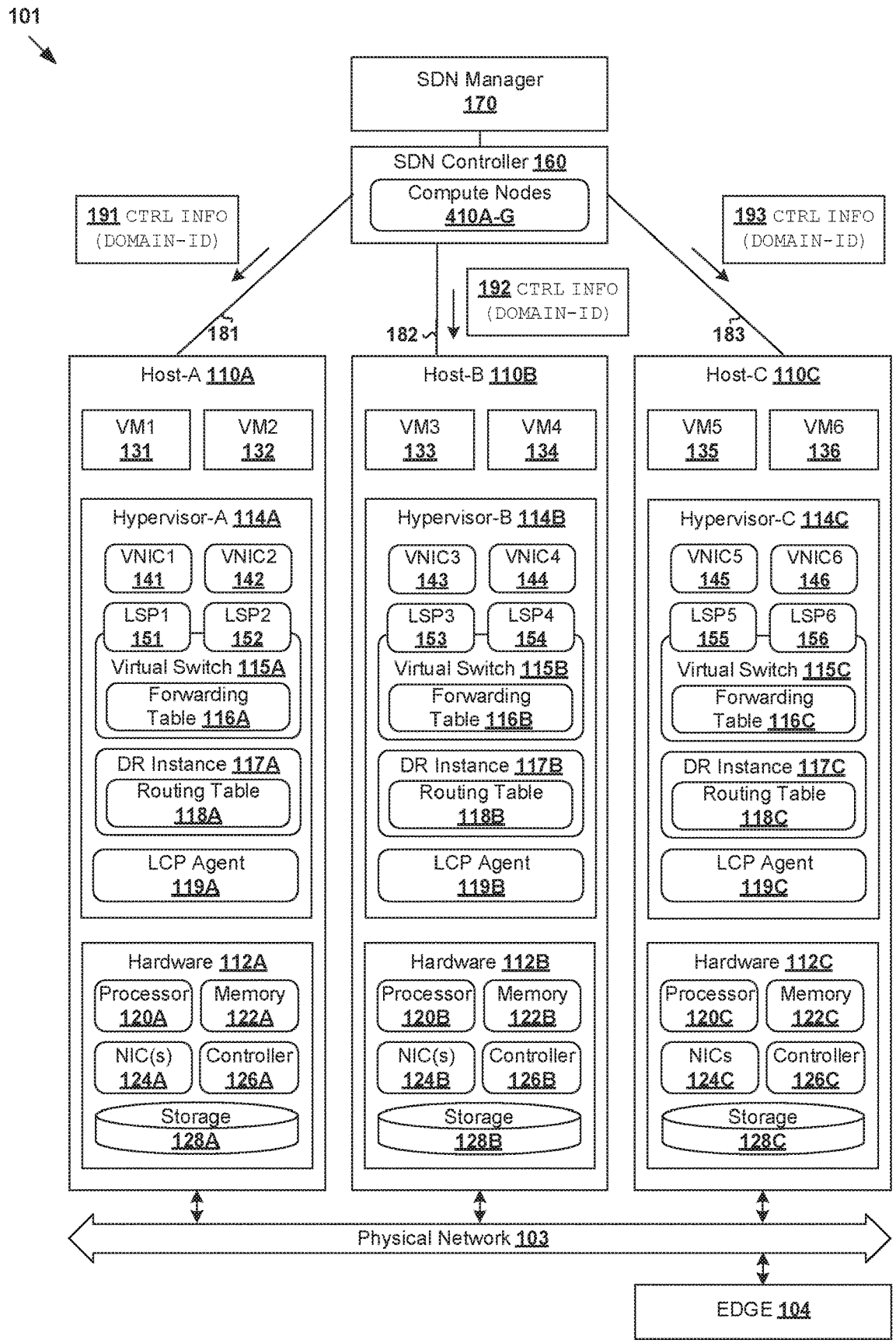
FIG. 2 is a schematic diagram illustrating an example physical implementation of the SDN environment in FIG. 1.

In more detail, FIG. 2 is a schematic diagram illustrating example physical implementation of SDN environment 100 in FIG. 1. Here, hardware 112A/112B/112C may include various physical components, such as central processing unit(s) (CPU(s)) 120A/120B/120C; memory 122A/122B/122C; physical network interface controllers (NICs) 124A/124B/124C; and storage disk(s) 126A/126B/126C, etc. Virtual resources are allocated to respective VMs 131-136 to support a guest operating system (OS) and application(s). For example, the virtual resources may include virtual CPU, guest physical memory, virtual disk, virtual network interface controller (VNIC), etc. Hardware resources may be emulated using virtual machine monitors (VMMs). For example in FIG. 1, VNICs 141-146 are emulated by corresponding VMMs (not shown for simplicity). The VMMs may be considered as part of respective VMs 131-136, or alternatively, separated from VMs 131-136. Instead of a one-to-one relationship, one VM may be associated with multiple VNICs (each VNIC having its own IP address).

Although examples of the present disclosure refer to VMs, it should be understood that a "virtual machine" running on a host is merely one example of a "virtualized computing instance" or "workload." A virtualized computing instance may represent an addressable data compute node (DCN) or isolated user space instance. In practice, any suitable technology may be used to provide isolated user space instances, not just hardware virtualization. Other virtualized computing instances may include containers (e.g., running within a VM or on top of a host operating system without the need for a hypervisor or separate operating system or implemented as an operating system level virtualization), virtual private servers, client computers, etc. Such container technology is available from, among others, Docker, Inc. The VMs may also be complete computational environments, containing virtual equivalents of the hardware and software components of a physical computing system.

The term "hypervisor" may refer generally to a software layer or component that supports the execution of multiple virtualized computing instances, including system-level software in guest VMs that supports namespace containers such as Docker, etc. Hypervisors 114A-C may each implement any suitable virtualization technology, such as VMware ESX® or ESXi™ (available from VMware, Inc.), Kernel-based Virtual Machine (KVM), etc. The term "packet" may refer generally to a group of bits that can be transported together, and may be in another form, such as "frame," "message," "segment," etc. The term "traffic" may refer generally to multiple packets. The term "layer-2" may refer generally to a link layer or Media Access Control (MAC) layer; "layer-3" to a network or Internet Protocol (IP) layer; and "layer-4" to a transport layer (e.g., using Transmission Control Protocol (TCP), User Datagram Protocol (UDP), etc.), in the Open System Interconnection (OSI) model, although the concepts described herein may be used with other networking models.

Hypervisor 114A/114B/114C implements virtual switch 115A/115B/115C and logical distributed router (DR) instance 117A/117B/117C to handle egress packets from, and ingress packets to, corresponding VMs 131-136. In SDN environment 100, logical switches and logical DRs may be implemented in a distributed manner and can span multiple hosts to connect VMs 131-136. For example, logical switches that provide logical layer-2 connectivity may be implemented collectively by virtual switches 115A-C and represented internally using forwarding tables 116A-C at respective virtual switches 115A-C. Forwarding tables 116A-C may each include entries that collectively implement the respective logical switches. Further, logical DRs that provide logical layer-3 connectivity may be implemented collectively by DR instances 117A-C and represented internally using routing tables 118A-C at respective DR instances 117A-C. Routing tables 118A-C may each include entries that collectively implement the respective logical DRs. Logical switches and routers will be discussed further below.

Packets may be received from, or sent to, each VM via an associated logical switch port. For example, logical switch ports 151-156 (labelled "LSP1" to "LSP6") are associated with respective VMs 131-136. Here, the term "logical port" or "logical switch port" may refer generally to a port on a logical switch to which a virtualized computing instance is connected. A "logical switch" may refer generally to a software-defined networking (SDN) construct that is collectively implemented by virtual switches 115A-C in the example in FIG. 1, whereas a "virtual switch" may refer generally to a software switch or software implementation of a physical switch. In practice, there is usually a one-to-one mapping between a logical port on a logical switch and a virtual port on virtual switch 115A/115B/115C. However, the mapping may change in some scenarios, such as when the logical port is mapped to a different virtual port on a different virtual switch after migration of the corresponding VM (e.g., when the source host and destination host do not have a distributed virtual switch spanning them).

SDN manager 170 and SDN controller 160 are example network management entities in SDN environment 100. To send and receive the control information (see 191-193), each host 110A/110B/110C may implement local control plane (LCP) agent 119A/119B/119C to interact with SDN controller 160. For example, control-plane channel 181/182/183 may be established between SDN controller 160 and host 110A/110B/110C using TCP over Secure Sockets Layer (SSL), etc. Management entity 160/170 may be implemented using physical machine(s), virtual machine(s), a combination thereof, etc. Hosts 110A-C may also maintain data-plane connectivity with each other via physical network 103.

(b) Logical Network Environment

Through virtualization of networking services in SDN environment 100, logical networks (also known as "logical overlay networks") may be provisioned, changed, stored, deleted and restored programmatically without having to reconfigure the underlying physical hardware architecture. A logical overlay network may be formed using any suitable tunneling protocol, such as Generic Network Virtualization Encapsulation (GENEVE), Virtual eXtensible Local Area Network (VXLAN), etc. Using tunneling protocol(s), tunnel encapsulation may be implemented to extend layer-2 segments across multiple hosts. The term "tunnel" in relation to a logical overlay network may refer generally to a tunnel established between a pair of virtual tunnel endpoints (VTEPs) over physical network 103, over which respective hosts are in layer-3 connectivity with one another. Hypervisor 114A/114B/114C may implement a VTEP to perform packet encapsulation and decapsulation.

In the example in FIG. 1, logical network environment 102 includes multiple logical network entities in the form of logical switches and logical routers. In general, a logical router may be a logical DR or logical service router (SR). A DR is deployed to provide routing services for VM(s) and implemented in a distributed manner in that it may span multiple hosts that support the VM(s). An SR is deployed to provide centralized stateful services, such as IP address assignment using dynamic host configuration protocol (DHCP), intrusion detection or prevention, load balancing, network address translation (NAT), etc. DR and SR are also known as "distributed" and "centralized" routing components, respectively.

In a data center with multiple tenants requiring isolation from each other, a multi-tier topology may be used. For example, a two-tier topology includes an upper tier-0 (labelled "T0" in FIG. 1) associated with a provider logical router (PLR) and a lower tier-1 (labelled "T1") associated with a tenant logical router (TLR). Each tier may include both DRs and SRs, or DRs and SRs on the upper tier but only DRs at the lower tier. The multi-tiered topology enables both the provider (e.g., data center owner) and tenant (e.g., data center tenant) to control their own services and policies. Each tenant has full control over its TLR (i.e., T1) policies, whereas common PLR (i.e., T0) policies may be applied to different tenants. As such, a logical router may be categorized as one of the following types: T1-DR (see 211-213), T1-SR (see 214), T0-DR (see 215) and T0-SR (see 216). For example, T1-DR1 211 (e.g., associated with a first tenant), T1-DR2 212 (e.g., second tenant) and T1-DR3 213 (e.g., third tenant) may be deployed to provide first-hop, layer-3 routing services for respective VMs 131-136.

Logical switches 201-204 may be deployed to provide first-hop, logical layer-2 switching services to VMs 131-136. For example, LS3 203 provides logical layer-2 connectivity to VM4 134 and VM5 135 and connects them to T1-DR2 212 for logical layer-3 routing. LS4 204 provides logical layer-2 connectivity to VM2 132 and VM6 136 and connects them to T1-DR2 212. LS1 201 connects VM1 131 to T1-DR1 211, which is also connected to LS2 202 and VM3 133. Logical switches 205-207 are known as transit logical switches that handle communication between two logical routers and not directly connected to any VM. For example, LS5 205 connects T1-DR3 213 with T1-SR1 215; LS6 206 connects T1-DR2 212 with T0-DR1 214; and LS7 207 connects T0-DR1 214 with T0-SR1 216. Logical switches 201-207 and DRs 211-214 are implemented in a distributed manner and can span multiple hosts.

For a logical switch that is connected to a VM, the logical switch is "instantiated" on a host supporting the VM. Multiple logical switches may be instantiated using one virtual switch 115A/115B/115C (a physical switch implemented in software) at hypervisor 114A/114B/114C. As discussed using FIG. 2, each instantiation of a logical switch is represented using an entry in forwarding table 116A/116B/116C maintained by virtual switch 115A/115B/115C. For example, at host-A 110A, forwarding table 116A includes entries associated with logical switches (e.g., LS1 201, LS2 202, LS4 204 and LS6 206) that are connected to VMs 131-132. At host-B 110B, forwarding table 116B includes entries associated with logical switches (e.g., LS1 201, LS2 202, LS3 203, LS6 206 and LS7 207) that are connected to VMs 133-134. At host-C 110C, forwarding table 116C includes entries associated with logical switches (e.g., 203-207) that are connected to VMs 135-136.

For a logical DR that is connected to a logical switch, the DR is also "instantiated" on each host on which the logical switch is instantiated. Multiple DRs may be instantiated using one logical DR instance 117A/117B/117C at hypervisor 114A/114B/114C. Each instantiation of a DR is represented using an entry in routing table 118A/118B/118C maintained by DR instance 117A/117B/117C. At host-A 110A in FIG. 2, routing table 118A includes entries associated with T1-DR1 211 and T1-DR3 213. At host-B 110B, routing table 118B includes entries associated with T1-DR1 211, T1-DR2 212 and T0-DR1 214. At host-C 110C, routing table 118C includes entries associated with T1-DR2 212, T0-DR1 214 and T1-DR3 213.

In practice, SRs such as T1-SR1 215 and T0-SR1 216 may be implemented using edge appliance(s) 104 in FIG. 2. In practice, an edge appliance may be implemented using VM(s) and/or physical machines (i.e., bare metal machines) that are capable of performing functionalities of a switch, router, bridge, gateway, edge appliance, or any combination thereof. For example, T0-SR1 216 may be deployed at the edge of a geographical site to facilitate north-south traffic to an external network (not shown in FIG. 2), such as a public network or another data center at a different geographical site. Logical switches 201-207 and logical routers 211-216 may be configured (e.g., by a network administrator) using management entity 160/170.

Routing Domain

To facilitate packet transmission and control information dissemination in SDN environment 100, SDN controller 160 on the central control plane (or any other management entity) may assign a "routing domain" to each logical switch and DR. Routing domain information may be used by a transport node's LCP agent (e.g., 119A/119B/119C) and dataplane to ensure that tunnels are created among transport nodes. For example, a tunnel may be established between a pair of VTEPs (not shown) on respective hosts 110A-B to facilitate packet communication between VM1 131 and VM3 133, which are connected via LS1 201, T1-DR1 211 and LS2 202. Based on the routing domain information, hypervisors 114A and 114C may be updated with each other's VTEP information to generate and send encapsulated packets over the tunnel.

Routing domain information may also be used to ensure that broadcast, unicast and multicast (BUM) traffic is replicated and forwarded to the correct set of transport nodes. For example, a gratuitous address resolution protocol (GARP) packet is a special ARP response that is broadcasted to announce a node's IP-to-MAC address mapping information to other nodes. In the example in FIG. 1, consider hypervisor-A 114A broadcasting a GARP packet to announce the IP-to-MAC address mapping information of VM1 131 to hypervisor-B 114B supporting VM3 133. In this case, a routing domain identifier (ID) may be assigned to LS1 201, T1-DR1 211 and LS2 202. Based on the GARP packet, T1-DR1 211 (i.e., replicated on both hypervisors 114A-B) may update its ARP cache with the address mapping information to facilitate communication between VM1 131 and VM3 133.

In practice, one of the challenges of routing domain computation is that the routing domain of a logical entity not only depends on its immediate neighbors but also on the entire logical network environment 102. Any network topology changes may affect the routing domain ID assigned to a logical entity. For example, the routing domain ID may change due to the configuration and re-configuration of various logical entities (e.g., 201-207, 211-216). Also, the type of logical routers (e.g., DR to SR and T0 to T1) may change, as does the path between logical entities, such as when a logical switch is attached to (or detached from) a logical router.

Conventionally, routing domain computation may be performed using graph or tree traversal approaches. Some examples have been discussed in a related U.S. patent application Ser. No. 15/486,261, which has been granted as U.S. Pat. No. 10,757,004 and is incorporated herein in its entirety by reference. Using a graph traversal approach, logical network environment 102 may be represented using a graph structure, which is traversed to search for logical entities affected by certain network topology changes. For a larger-scale logical network environment 102, some users may prefer a more scalable and efficient approach to handle routing domain computation due to network topology changes.

Incremental and Parallel Routing Domain Computation

According to examples of the present disclosure, routing domain computation may be performed in an incremental and/or parallel manner. Unlike conventional approaches that rely on graph traversal, computation workload may be distributed among a set of multiple compute nodes. Each compute node may be configured to maintain its own state information and perform a subset of routing domain computation tasks, thereby improving computational efficiency and scalability. Here, the term "compute node" or "computational unit" may refer generally to hardware and/or software component(s) capable of performing a subset of routing domain computation tasks.

According to an incremental approach, each compute node may maintain its own state information and perform incremental update(s) based on topology change(s) to logical network environment 102. Here, the term "incremental" may refer generally to a partial update to a compute node's state information (as opposed to a full update that starts from scratch without any state information). According to a parallel approach, at least some of the compute nodes may operate independently from each other to each perform a subset of routing domain computation tasks in parallel (i.e., simultaneously). Depending on the desired implementation, routing domain computation may be further parallelized internally within a particular compute node for further efficiency and scalability improvement, such as by processing multiple partitions in parallel (to be discussed further using FIG. 10).

Figure 3:
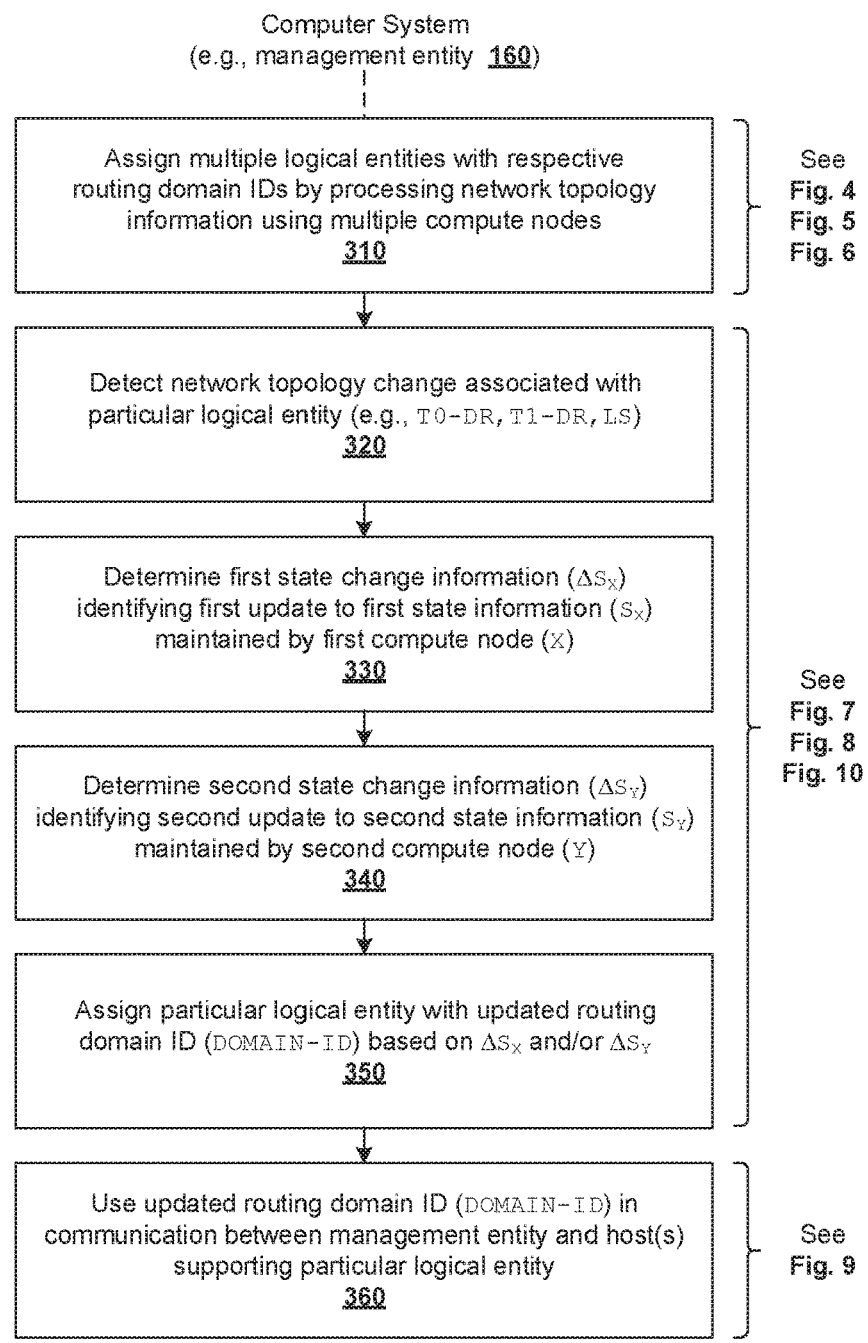
FIG. 3 is a flowchart of an example process for a computer system to perform routing domain computation.

In more detail, FIG. 3 is a flowchart of example process 300 for a computer system to perform routing domain computation for logical network environment 102. Example process 300 may include one or more operations, functions, or actions illustrated by one or more blocks, such as 310 to 360. The various blocks may be combined into fewer blocks, divided into additional blocks, and/or eliminated depending on the desired implementation. Examples of the present disclosure may be performed using any "computer system" capable of supporting multiple compute nodes, such as SDN controller 160 or any other management entity.

At 310 in FIG. 3, SDN controller 160 may assign multiple logical entities with respective routing domain identifiers (IDs) by processing network topology information specifying how the multiple logical entities are connected. In practice, the multiple logical entities may include any suitable number of logical switches (e.g., 201-207) and logical routers (e.g., 211-216). As will be explained further using FIGS. 4-5, the network topology information may be processed using multiple compute nodes (see 410A-G in FIGS. 4 and 5) sharing routing domain computation workload.

At 320 and 330 in FIG. 3, in response to detecting a network topology change associated with a particular logical entity within logical network environment 102, SDN controller 160 may determine first state change information (denoted as $\Delta S_X$ for node X) using a first compute node (X). Further, at 340, SDN controller 160 may determine second state change information (denoted as $\Delta S_Y$ for node Y) using a second compute node (Y) from multiple compute nodes.

Block 330 may involve determining first state change information ($\Delta S_X$) based on the network topology change to identify at least one first update to first state information ($S_X$) maintained by the first compute node (X). As will be explained using FIGS. 7-8, the first update may be one of the following: (a) addition or removal of the particular logical entity (e.g., removal of LS1 201); (b) modification of an attribute of the particular logical entity (e.g., changing a router type from DR to SR or T1-DR to T0-DR); and (c) addition or removal of a connection between the particular logical entity and another logical entity (e.g., detaching LS6 206 from T0-DR1 214). Note that the first update may represent an incremental update to $S_X$.

Block 340 may involve determining second state change information ($\Delta S_Y$) based on the first state change information ($\Delta S_X$) to identify at least one second update to second state information ($S_Y$) maintained by the second compute node (Y). As will be explained using FIGS. 7-8, the second update may be one of the following: (a) addition or removal of a path between a tier-1 logical DR and a tier-0 logical DR (e.g., detaching T1-DR2 212 from T0-DR1 214); (b) addition or removal of a path between a logical switch and a logical DR (e.g., attaching another logical switch to T0-DR1 214); and (c) modification of an attribute of a logical DR connected with a logical switch. Note that the second update may represent an incremental update to $S_Y$.

At 350 in FIG. 3, SDN controller 160 may assign the particular logical entity with an updated routing domain ID based on the first state information ($S_X$) maintained by the first compute node (X) and/or the second state change information ($S_Y$) maintained by the second compute node (Y). Block 350 may involve applying rule(s) based on the first update and/or second update using a third compute node. At 360, SDN controller 160 may use the updated routing domain ID in a communication between SDN controller 160 and host(s) supporting the particular logical entity. Example communication of routing domain ID is shown in 191-193 in FIG. 2.

According to examples of the present disclosure, the "first state change information" ($\Delta S_X$) at block 330 may represent a "delta output" (i.e., what is changed from previous state information) of the first compute node (X). The "first state change information" ($\Delta S_X$) may also form a "delta input" to the second compute node (Y). This way, when a network topology change is detected, the first compute node (X) and the second compute node (Y) may perform incremental update(s) to respective state information ($S_X$, $S_Y$). Each compute node is configured to determine its own delta output based on delta input(s) from other compute node(s).

Note the "second compute node" (Y) may be any suitable compute node that depends on the delta output (i.e., state change information) from another compute node, being "first compute node" (X). Also, there may be multiple "second compute nodes" that operate in parallel. By maintaining their own state information, it is not necessary for compute nodes to start every iteration of routing domain computation from scratch. Based on the state change information, it is not necessary to make any state change(s) for other logical entities that are not affected by the network topology change. Various examples will be discussed below using FIGS. 4-10.

Compute Nodes

Figure 4:
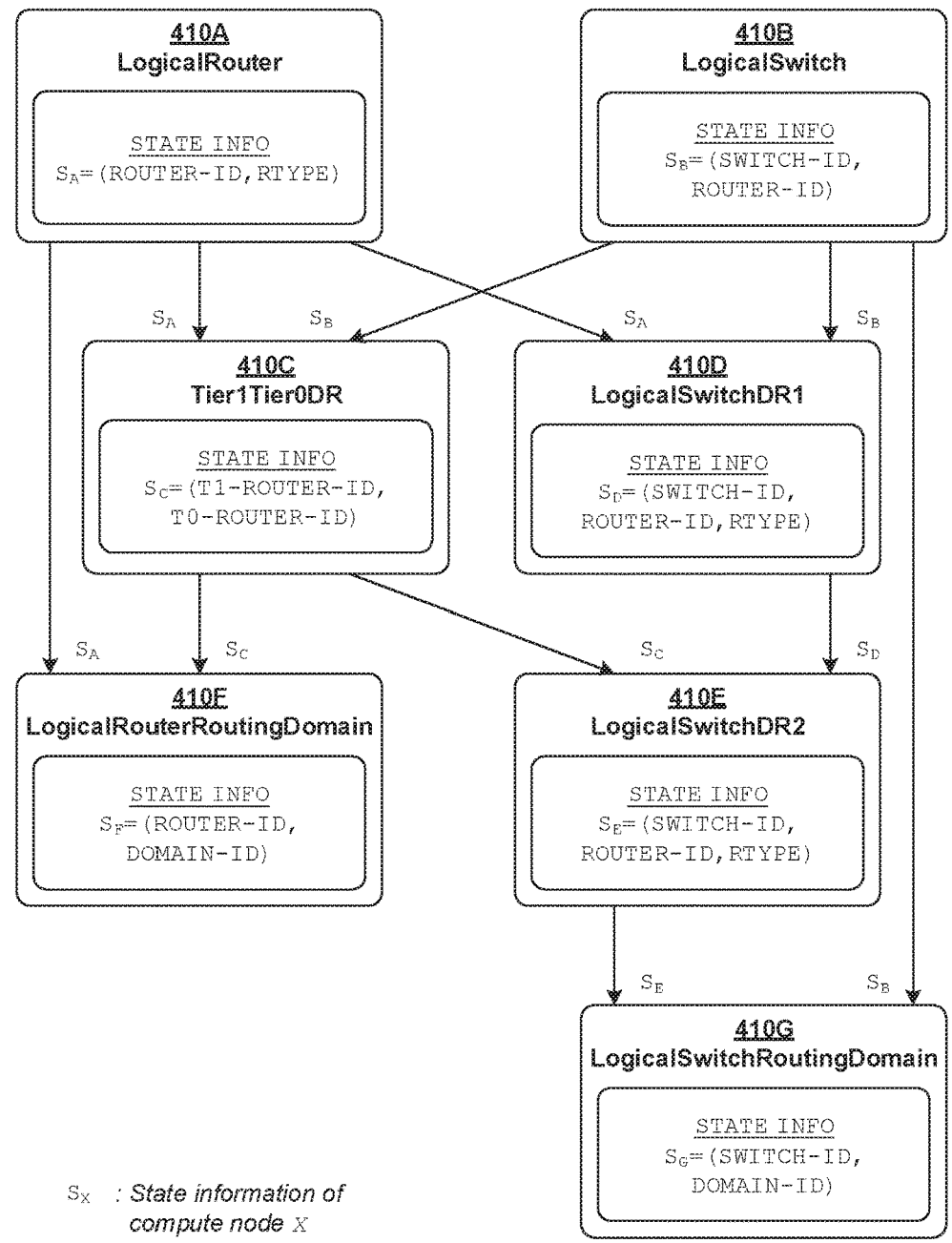
FIG. 4 is a schematic diagram illustrating example compute nodes configured to perform routing domain computation.
Figure 5:
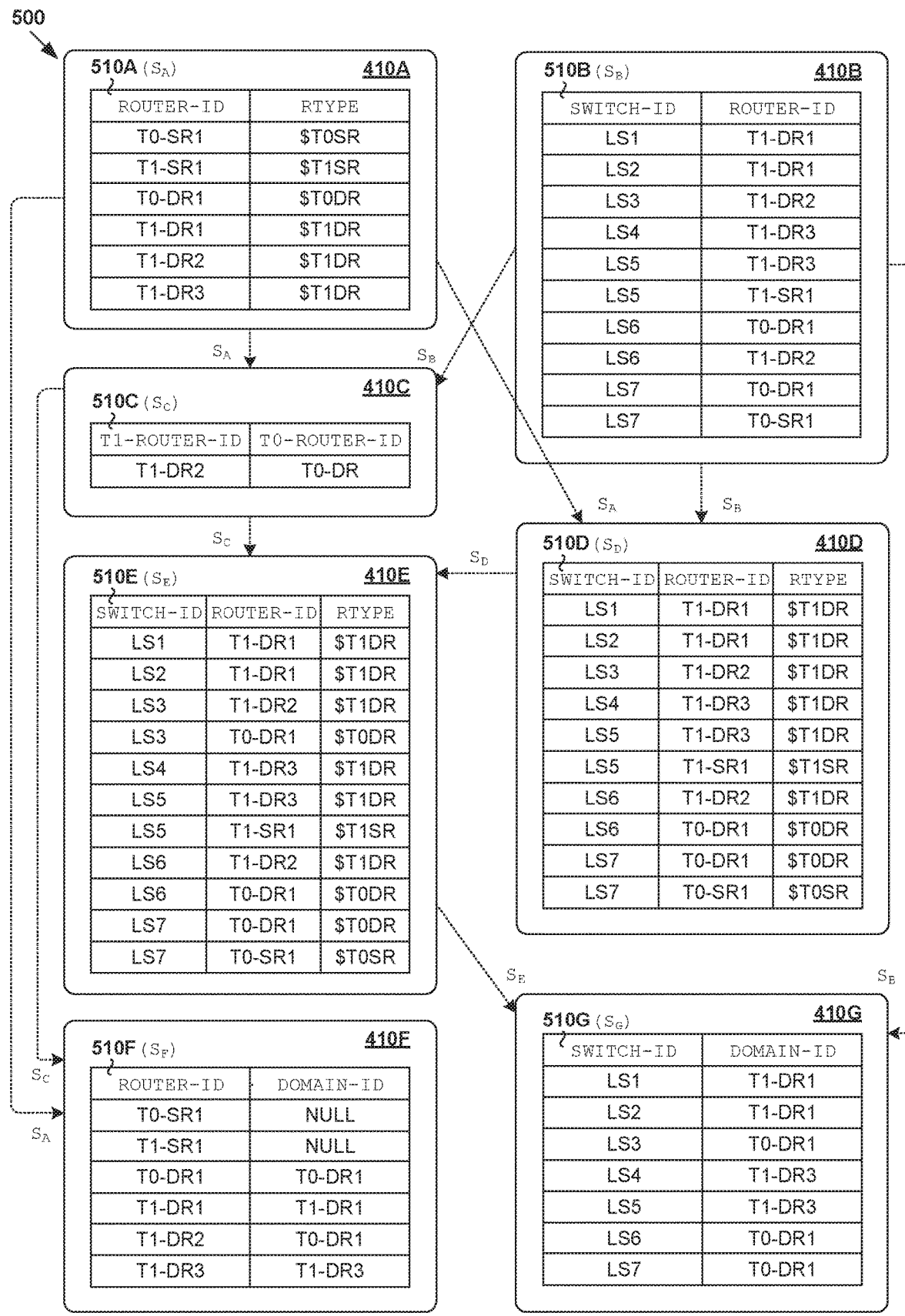
FIG. 5 is a schematic diagram illustrating example state information maintained by the compute nodes in FIG. 4.

An example set of multiple (M) compute nodes will be discussed using FIGS. 4-5. To provide an overview, FIG. 4 is a schematic diagram illustrating example compute nodes configured to perform routing domain computation 400. More detailed examples are shown in FIG. 5, which is a schematic diagram illustrating example state information 500 maintained by compute nodes 410A-G in FIG. 4. Here, a set of routing domain computation tasks may be distributed among multiple (M=7) compute nodes 410A-G. Each compute node may be configured to maintain its own state information and perform a subset of routing domain computation tasks.

At 410A in FIG. 4, a compute node (see "LogicalRouter") may be configured to generate and store (e.g., cache) state information ($S_A$) that maps a logical router (ROUTER-ID) to a logical router type (RTYPE). Referring also to 510A in FIG. 5, compute node 410A may include state information associated with logical SRs 215-216: (ROUTER-ID=T0-SR1, RTYPE=$T0SR) and (T1-SR1, $T1SR) associated with respective T0-SR1 216 and T1-SR1 215. Note that ROUTER-ID uniquely identifies a logical router in logical network environment 102 and '$' indicates RTYPE. State information associated with logical DRs 211-214 may include (ROUTER-ID=T1-DR1, RTYPE=$T1DR), (T1-DR2, $T1DR), (T1-DR3, $T1DR) and (T0-DR1, $T0DR).

At 410B in FIG. 4, a compute node (see "LogicalSwitch") may be configured to generate and store state information ($S_B$) that maps a logical switch (SWITCH-ID) to a directly-connected logical router (ROUTER-ID). Note that SWITCH-ID uniquely identifies a logical switch in logical network environment 102. At 510B in FIG. 5, the state information may include (SWITCH-ID=LS1, ROUTER-ID=T1-DR1) for LS1 201; (LS2, T1-DR1) for LS2 202; (LS3, T1-DR2) for LS3 203 and (LS4, T1-DR3) for LS4 204. Since LS5 205 is directly connected to both T1-DR3 213 and T1-SR1 215, there are two entries: (LS5, T1-DR3) and (LS5, T1-SR1). Similarly, LS6 206 and LS7 207 each have two entries: (LS6, T0-DR1), (LS6, T1-DR2), (LS7, T0-DR1) and (LS7, T0-SR1).

At 410C in FIG. 4, a compute node (see "Tier1Tier0DR") may be configured to generate and store state information ($S_C$) that maps a T1 logical DR (T1-ROUTER-ID) to a T0 logical DR (T0-ROUTER-ID) with a logical switch connects both. The state information ($S_C$) may be computed based on the following inputs: (1) state information ($S_A$)=(ROUTER-ID, RTYPE) from node 410A and (2) state information ($S_B$)=(SWITCH-ID, ROUTER-ID) from node 410B. At 510C in FIG. 5, compute node 410C may update the state information to include (T1-DR2, T0-DR) based on how LS6 206 connects T1-DR2 212 to T0-DR1 214. Note that there is no entry for T1-DR1 211 and T1-DR3 213, which are not connected to any T0 logical DR.

At 410D in FIG. 4, a compute node (see "LogicalSwitchDR1") may be configured to generate and store state information ($S_D$) that maps a logical switch (SWITCH-ID) to a directly-connected logical router (ROUTER-ID) and its logical router type (RTYPE). The state information ($S_D$) may be computed based on the following inputs: (1) $S_A$=(ROUTER-ID, RTYPE) from node 410A and (2) $S_B$=(SWITCH-ID, ROUTER-ID) from node 410B. At 510D in FIG. 5, state information ($S_D$) associated with logical switches 201-204 may include: (LS1, T1-DR1, $T1DR), (LS2, T1-DR1, $T1DR), (LS3, T1-DR2, $T1DR) and (LS4, T1-DR3, $T1DR). State information associated with transit logical switches 205-207 may include: (LS5, T1-DR3, $T1DR), (LS5, T1-SR1, $T1SR), (LS6, T1-DR2, $T1DR), (LS6, T0-DR1, $T0DR), (LS7, T0-DR1, $T0DR) and (LS7, T0-SR1, $T0SR).

At 410E in FIG. 4, a compute node (see "LogicalSwitchDR2") may be configured to generate and store state information ($S_F$) that maps a logical switch (SWITCH-ID) to a logical router (ROUTER-ID) and associated logical router type (RTYPE). Compared with 410D, the logical router may be a T0 logical DR that is indirectly connected to the logical switch or a directly connected T1 logical DR. $S_F$ may be computed based on: (1) $S_C$=(T1-ROUTER-ID, T0-ROUTER-ID) from node 410C and (2) $S_D$=(SWITCH-ID, ROUTER-ID, RTYPE) from node 410D. At 510E in FIG. 5, compute node 410F may determine that LS3 203 is indirectly connected to T0-DR1 214 via T1-DR2 212 based on ($S_C$, $S_D$). Compared with $S_D$ from node 410D, $S_E$ includes an additional entry: (SWITCH-ID=LS3, ROUTER-ID=T0-DR1, RTYPE=$T0DR). Note that compute nodes 410D-E are configured to perform different computations based on different inputs, with node 410D filtering out logical switches that are not connected to any logical DR. Depending on the desired implementation, nodes 410D-E may be combined, or further divided into smaller computational units.

Routing Domain ID Assignment (a) Logical Routers

At 410F in FIG. 4, a compute node (see "LogicalRouterRoutingDomain") may be configured to assign a routing domain ID to each logical router. Routing domain computation may be performed based on: (1) $S_A$=(ROUTER-ID, RTYPE) from node 410A and (2) $S_C$=(T1-ROUTER-ID, T0-ROUTER-ID) from node 410C. The output is state information ($S_F$)=(ROUTER-ID, DOMAIN-ID) that assigns a routing domain ID (DOMAIN-ID) to each ROUTER-ID identified in $S_A$. Node 410F may perform routing domain computation for logical routers 211-216 based on any suitable rules, some examples of which are explained below. See also 510F in FIG. 5.

(1) According to a first rule, in response to determination that a logical router is not a logical DR, DOMAIN-ID=0 or NULL (i.e., no routing domain) may be assigned to the logical router. This rule applies to T0-SR1 216 and T1-SR1 215 in FIG. 5.

(2) According to a second rule, in response to determination that a logical router with ROUTER-ID is associated with RTYPE=$T0DR, DOMAIN-ID=ROUTER-ID may be assigned to the logical router. This applies to T0-DR1 214 assigned with DOMAIN-ID=T0-DR1 in FIG. 5.

(3) According to a third rule, in response to determination that a logical router with ROUTER-ID is associated with RTYPE=$T1DR and not connected to another logical DR with RTYPE=$T0DR, DOMAIN-ID=ROUTER-ID may be assigned to the logical router. This applies to T1-DR1 211 (DOMAIN-ID=T1-DR1) and T1-DR3 213 (DOMAIN-ID=T1-DR3) in FIG. 5.

(4) According to a fourth rule, in response to determination that a logical router with ROUTER-ID is associated with RTYPE=$T1DR and connected to another logical DR with RTYPE=$T0DR, DOMAIN-ID=T0-ROUTER-ID may be assigned. This applies to T1-DR2 212. In particular, based on (T1-ROUTER-ID=T1-DR2, T0-ROUTER-ID=T0-DR1) from node 410C, compute node 410F may assign T1-DR2 212 with DOMAIN-ID=T0-DR1.

(b) Logical Switches

At 410G in FIG. 4, a compute node (see "LogicalSwitchRoutingDomain") may be configured to assign a routing domain ID to each logical switch. Routing domain computation may be performed based on the following inputs: (1) state information ($S_B$)=(SWITCH-ID, ROUTER-ID) from node 410B and (2) state information ($S_E$)=(SWITCH-ID, ROUTER-ID, RTYPE) from node 410E. The output is state information ($S_G$)=(SWITCH-ID, DOMAIN-ID), thereby assigning a routing domain ID (DOMAIN-ID) to each SWITCH-ID identified by node 410B. Node 410G may perform routing domain computation for logical routers 201-207 based on any suitable rules, some examples of which are explained below.

(1) According to a first rule, in response to determination that a particular logical switch (SWITCH-ID) only has one entry in state information ($S_E$), compute node 410G may determine whether the logical switch is directly connected to a single logical DR (ROUTER-ID). If yes, DOMAIN-ID=ROUTER-ID may be assigned to the logical switch. This applies to LS1 201 and LS2 202, which are assigned with DOMAIN-ID=T1-DR1 based on their connection with T1-DR1 211. Similarly, LS4 204 may be assigned with DOMAIN-ID=T1-DR3 based on its connection with T1-DR3 213.

(2) According to a second rule, in response to determination that a particular SWITCH-ID has multiple entries in state information ($S_E$), compute node 410G may determine whether the logical switch is connected to both a T1 logical DR and T0 logical DR. If yes, the logical switch may be assigned with DOMAIN-ID=ROUTER-ID identifying the T0 logical DR. This applies to LS3 203, which is assigned with DOMAIN-ID=T0-DR1 based on its indirect connection with T0-DR1 214 and direct connection with T1-DR2 212. This also applies to LS6 206, which is assigned with DOMAIN-ID=T0-DR1 based on its connection with both T0-DR1 214 and T1-DR2 212.

(3) According to a third rule, in response to determination that a particular SWITCH-ID has multiple entries in state information ($S_E$), compute node 410G may determine whether the logical switch is connected to both a logical DR (i.e., RTYPE=T1-DR or T0-DR) and a logical SR (i.e., RTYPE=T1-SR or T0-SR). If yes, the logical switch may be assigned with DOMAIN-ID=ROUTER-ID identifies the logical DR (not SR). This applies to LS5 205, which is assigned with DOMAIN-ID=T0-DR1 based on its connection with T0-DR1 214 and T0-SR1 216. Similarly, LS7 207 may be assigned with DOMAIN-ID=T1-DR3 based on its connection with T1-DR3 213 and T1-SR1 215.

Depending on the desired implementation, an exception for the second rule is the case where a logical switch is indirectly connected to a T0 logical DR via a logical SR. This is because a logical DR that is connected to a logical SR is assigned with its own routing domain. For example, consider T1-DR3 213 (DOMAIN-ID=T1-DR3) that is connected to T1-SR1 215. Even a new connection or path is formed between T1-DR3 213 and a T0 logical DR (e.g., T0-DR 214) via T1-SR1 215, DOMAIN-ID=T1-DR3 remains the same for T1-DR3 213. Similarly, DOMAIN-ID=T1-DR3 also remains the same for connecting LS4 204 and LS5 205. Any alternative and/or additional "rules" may be configured for each compute node to achieve the desired routing domain computation results.

(c) Control Information Dissemination

Figure 6:
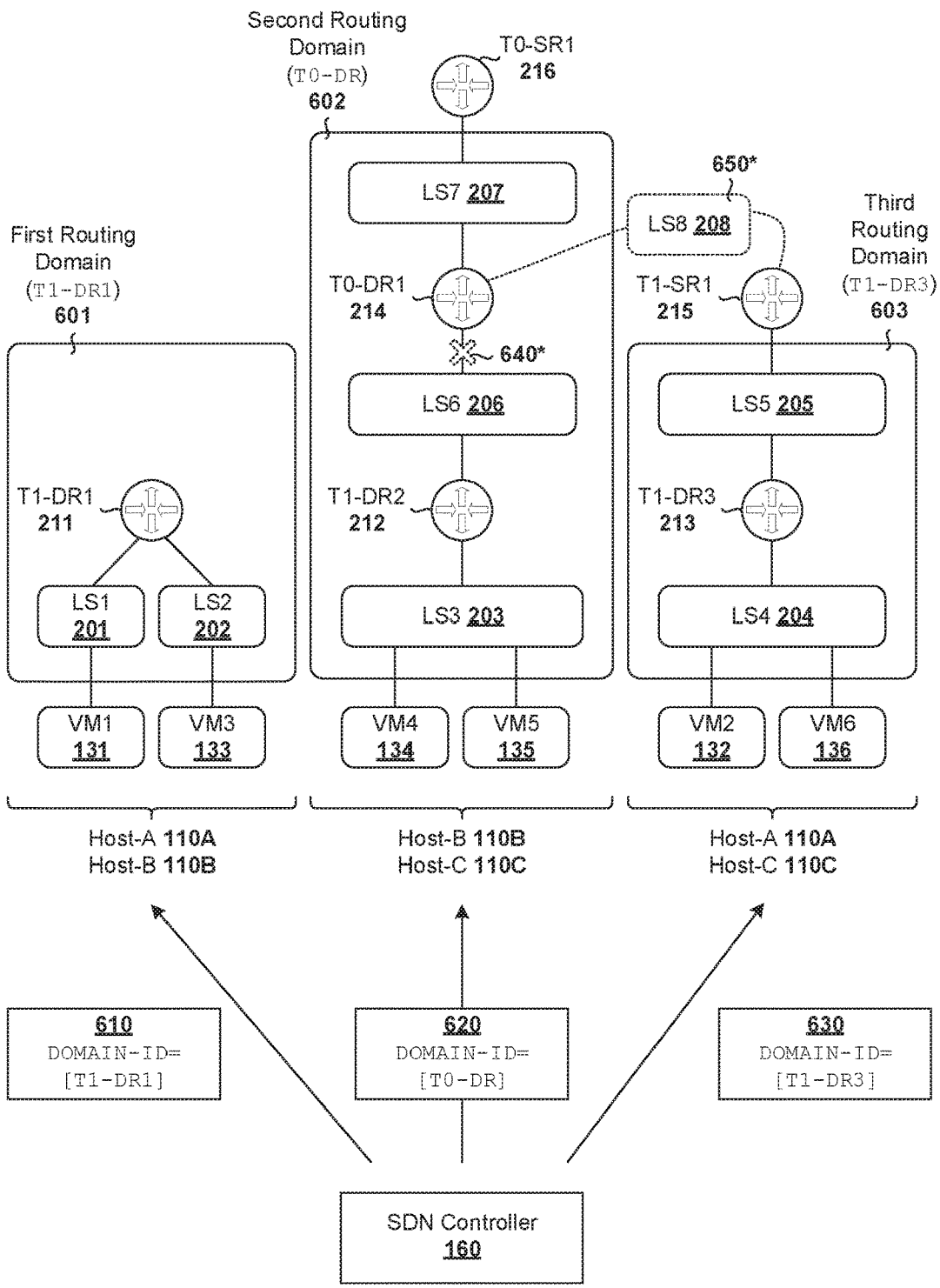
FIG. 6 is a schematic diagram illustrating example routing domain identifiers (IDs) that are computed using the examples in FIGS. 4-5.

Once routing domain computation is completed, SDN controller 160 may use a routing domain ID in a communication with the relevant hosts. For example, the "communication" may be performed to inform the hosts of the routing domain ID assigned to logical switch(es) and/or logical DR(s) instantiated on the hosts. The "communication" may be performed to disseminate control information associated with the logical switch(es) and/or logical DR(s), such as VTEP information to facilitate packet encapsulation between a pair of hosts. Some examples are shown in FIG. 6, which is a schematic diagram illustrating example routing domain IDs that are computed using the examples in FIGS. 4-5.

In a first example (see 601), a first logical entity set=(T1-DR1 211, LS1 201, LS2 202) may form a first routing domain. At 610, SDN controller 160 may use DOMAIN-ID=T1-DR1 in a communication with hosts 110A-B on which the first logical entity set is instantiated. In practice, for a source transport node (e.g., host-A 110A) to reach a destination transport node (e.g., host-B 110B), the source transport node is responsible for source-based distributed routing.

In a second example (see 602), a second routing domain may be formed by a second set=(LS3 203, T1-DR2 212, LS6 206, T0-DR1 214, LS7 207). At 620, SDN controller 160 may use DOMAIN-ID=T0-DR in a communication with host-B 110B and host-C 110C on which the second set is instantiated. In a third example (see 602), a third routing domain may be formed by a third set=(LS4 204, T1-DR3 213, LS5 205). At 630, SDN controller 160 may use DOMAIN-ID=T1-DR3 in a communication with host-A 110A and host-C 110C on which the third set is instantiated.

Throughout the present disclosure, various examples have been explained using DOMAIN-ID=ROUTER-ID that uniquely identifies a logical DR. In practice, any alternative DOMAIN-ID may be assigned to logical switches and logical DRs forming a particular routing domain, such as DOMAIN-ID="RD1" for first routing domain 601, "RD2" for second routing domain 602, "RD3" for third routing domain 603, and so on. In other words, it is not necessary to use ROUTER-ID as the routing domain ID.

Network Topology Changes

Figure 7:
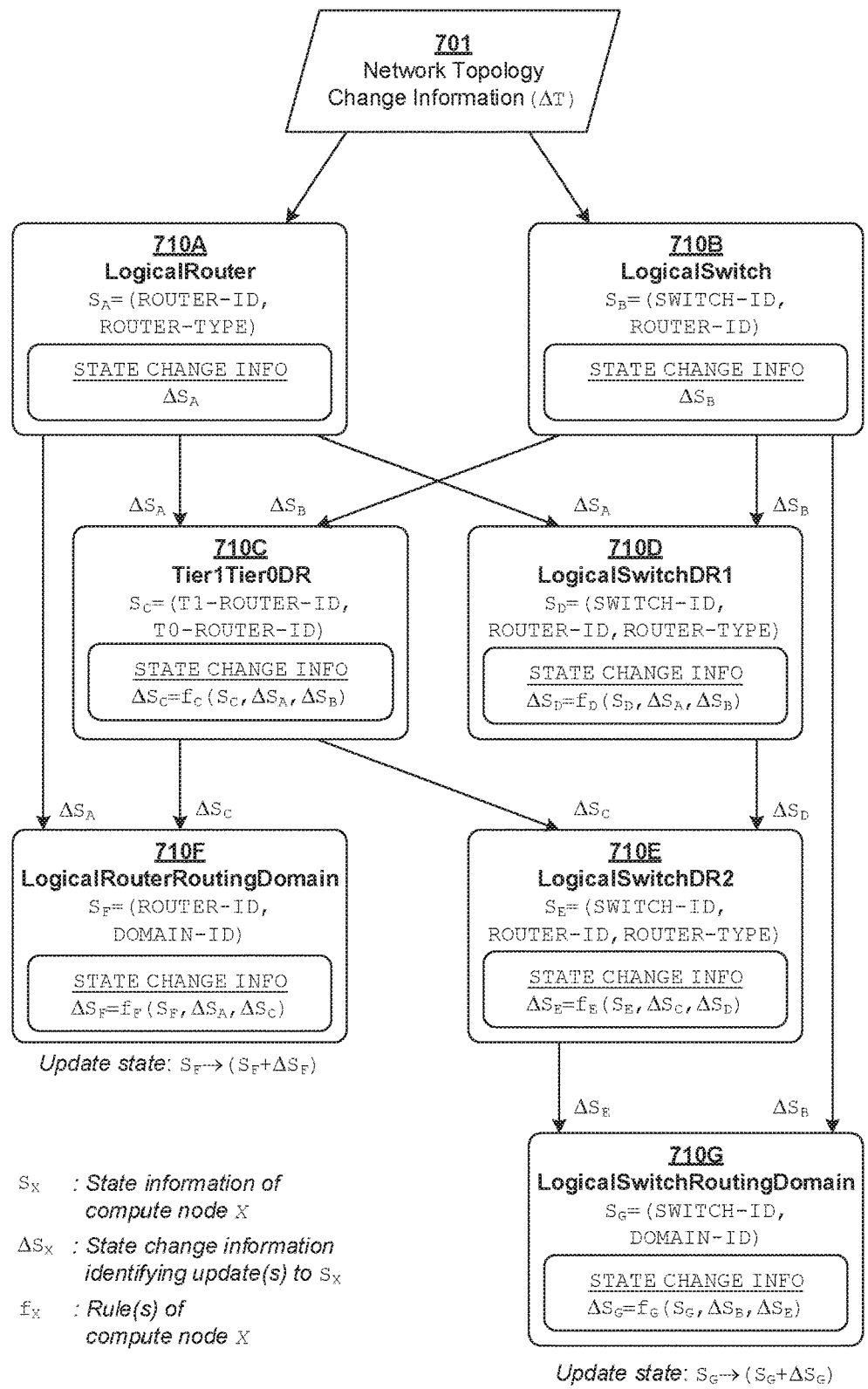
FIG. 7 is a schematic diagram illustrating example compute nodes configured to perform routing domain computation based on network topology change(s)
Figure 8:
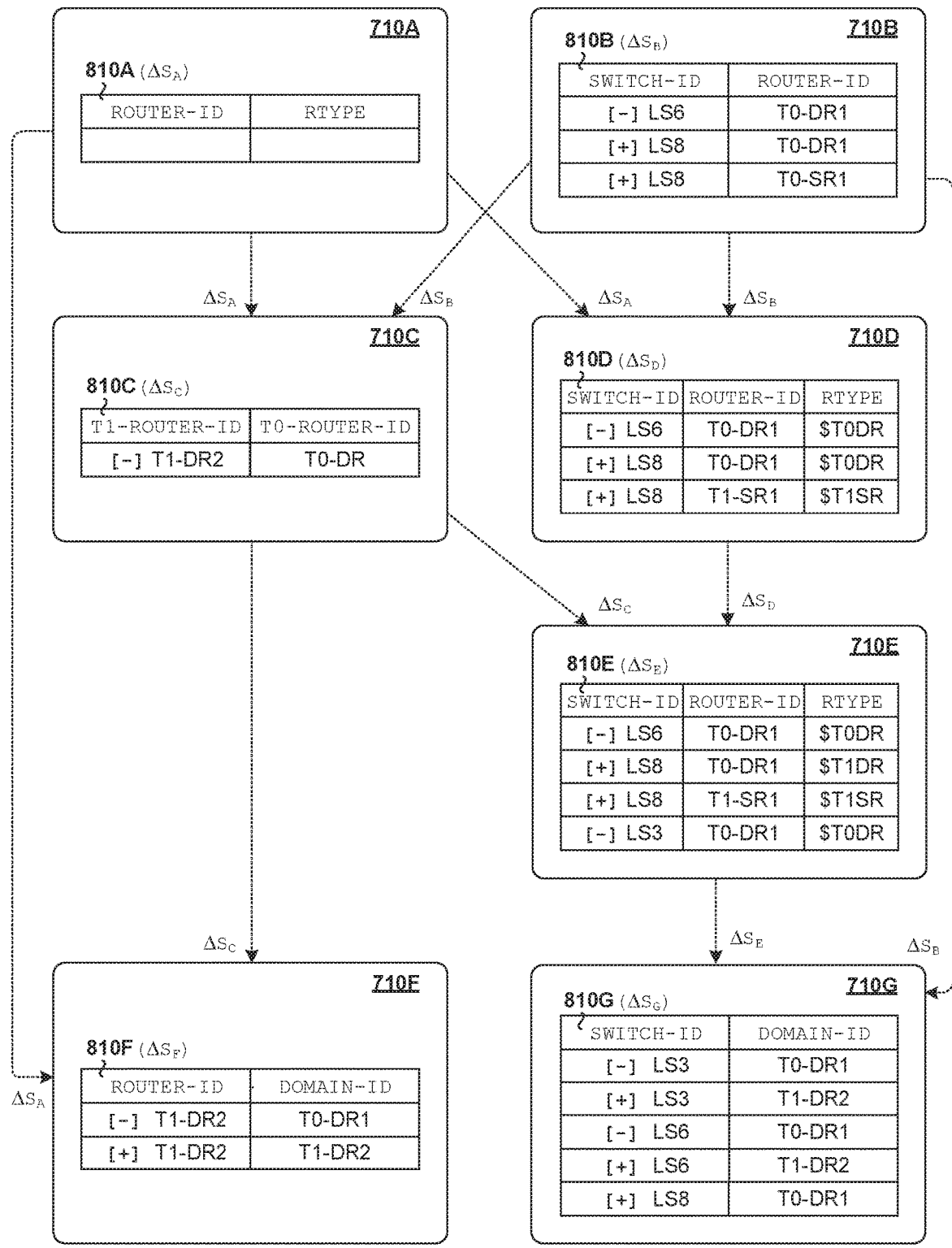
FIG. 8 is a schematic diagram illustrating example state change information determined by the compute nodes in FIG. 7.

According to examples of the present disclosure, routing domain computation may be updated incrementally in response to topology change(s) in logical network environment 102. To provide an overview, FIG. 7 is a schematic diagram illustrating example compute nodes 710A-G configured to perform routing domain computation based on network topology change(s) 700. More detailed examples are shown in FIG. 8, which is is a schematic diagram illustrating example state change information 810A-G determined by compute nodes 710A-G in FIG. 7. Compute nodes 710A-G in FIGS. 7-8 correspond with respective 410A-G in FIGS. 4-5.

In the following, $\Delta S_X$ ($\Delta$=delta) denotes the state information change determined by a particular compute node X. State information change ($\Delta S_X$) may be determined as a function ($f_X$) of previous state information ($S_X$) and delta input information (i.e., what is changed from previous input information). This way, compute node X may perform incremental updates by processing its "delta input information" to generate "delta output information" in the form of state change information ($\Delta S_X$). The incremental updates should be contrasted against conventional approaches that repeat the entire process of routing domain computation when topology changes are detected.

In the example in FIG. 7. the "first compute node" (X) for determining the "first state change information" at block 330 in FIG. 3 may be exemplified using compute nodes 410A-B, where X∈{A, B}. The "second compute node" (Y) for determining "second state change information" and (directly or indirectly) depends on the delta output of the first compute node at block 340 in FIG. 3 may be exemplified using compute nodes 410C-E, where Y∈{C, D, E}. A "third compute node" (Z) for routing ID assignment may be exemplified using compute nodes 410F-G, where Z∈{F, G}. Using compute nodes 710A-G, a total ordering across different inputs is generally not required. Each compute node computes its own delta output (i.e., state change information) based on the delta input(s) the compute node receives.

Network topology change information 701 (denoted as ΔT) may identify any suitable change(s). For example, network topology change information 701 may specify two example changes that are shown in FIG. 6. A first change (see 640 in FIG. 6) may involve removing a path or connection between LS6 206 and T0-DR1 214. A second change (see 650) may involve connecting T1-SR1 215 to T0-DR1 214 via another logical switch (see LS8 208 in FIG. 9). In practice, SDN controller 160 may obtain network topology change information 701 from any suitable source(s), such as another component on the central control plane, SDN manager 170 (e.g., based on re-configuration by a network administrator), hosts 110A-C, etc.

At 710A in FIG. 7, compute node 710A may process network topology change information 701 to generate state change information ($\Delta S_A$). In the example in FIG. 8, since there is no change to logical routers 211-216 (i.e., no addition, removal or attribute change), state information ($S_A$) of compute node 710A remains unchanged because there is no change to logical routers 211-216. In other words, $\Delta S_A$=0 for compute node 710A. See 810A in FIG. 8.

At 710B in FIG. 7, compute node 710B may process network topology change information 701 to generate state change information ($\Delta S_B$). In the example in FIG. 8, $\Delta S_B$ may identify deletion of (SWITCH-ID=LS6, ROUTER-ID=T0-DR1) in response to detecting a removed connection between LS6 206 and T0-DR1 214 network topology change information 701. $\Delta S_B$ may further identify the addition of (LS8, T0-DR1) and (LS8, T1-SR1) to indicate a new connection between T0-DR1 214 and T1-SR1 215 via LS8 208. See 810B in FIG. 8.

At 710C in FIG. 7, compute node 710C may generate state change information ($\Delta S_C$) based on ($\Delta S_A$, $\Delta S_B$)=delta input information from compute nodes 710A-B, such as using $\Delta S_C = f_C(S_C, \Delta S_A, \Delta S_B)$. Here, $f_C$ may represent a function applicable by compute node 710C to update $S_C$=current state information based on the delta input information. Based on $\Delta S_B$ identifying the deletion of (SWITCH-ID=LS6, ROUTER-ID=T0-DR1) in FIG. 8, compute node 710C may determine that T1-DR2 212 is no longer connected to T0-DR1 214 via LS6 206. In this case, $\Delta S_C$ may include a deletion of (T1-ROUTER-ID=T1-DR2, T0-ROUTER-ID=T0-DR1). See 810C in FIG. 8.

At 710D in FIG. 7, compute node 710D may generate state change information ($\Delta S_D$) incrementally based on ($\Delta S_A$, $\Delta S_B$)=delta input information, such as using $\Delta S_D = f_D(S_D, \Delta S_A, \Delta S_B)$. Similarly, $f_D$ may represent a function applicable by compute node 710C to update $S_D$=current state information based on ($\Delta S_A$, $\Delta S_B$). In the example in FIG. 8, $\Delta S_D$ may identify the deletion of corresponding (SWITCH-ID=LS6, ROUTER-ID=T0-DR1, RTYPE=$T0DR). Further, $\Delta S_D$ may identify the addition of (LS8, T0-DR1, $T0DR) and (LS8, T1-SR1, $T0SR) for the new connection via LS8 208. See 810D in FIG. 8.

At 710E in FIG. 7, compute node 710E may generate state change information ($\Delta S_E$) incrementally based on ($\Delta S_C$, $\Delta S_D$)=delta input information, such as using $\Delta S_E = f_E(S_E, \Delta S_C, \Delta S_D)$. Similarly, $f_E$ may represent a function applicable by compute node 710E to update $S_E$=current state information based on ($\Delta S_C$, $\Delta S_D$). In the example in FIG. 8, $\Delta S_E$ may be generated to specify the deletion of (SWITCH-ID=LS6, ROUTER-ID=T0-DR1, RTYPE=$T0DR), as well as the addition of (LS8, T0-DR1, $T0DR) and (LS8, T1-SR1, $T1SR). Further, since LS6 206 is detached from T0-DR1 214, LS3 203 is no longer indirectly connected to T0-DR1 214. As such, $\Delta S_E$ may be generated to further identify the deletion of (LS3, T0-DR1, $T0DR). See 810E in FIG. 8.

At 710F in FIG. 7, compute node 710F may generate state change information ($\Delta S_F$) incrementally based on ($\Delta S_A$, $\Delta S_C$)=delta input information, such as using $\Delta S_F = f_F(S_F, \Delta S_A, \Delta S_C)$. Here, $f_F$ may represent a function applicable by compute node 710F to update $S_F$=current state information based on the delta input information. In the example in FIG. 8, since T1-DR2 212 is no longer connected with T0-DR1 214, (ROUTER-ID=T1-DR2, DOMAIN-ID=T0-DR1) may be replaced by (ROUTER-ID=T1-DR2, DOMAIN-ID=T1-DR2). See 810F in FIG. 8.

At 710G in FIG. 7, compute node 710G may generate state change information ($\Delta S_G$) incrementally based on ($\Delta S_A$, $\Delta S_F$)=delta input information, such as using $\Delta S_F = f_G(S_F, \Delta S_A, \Delta S_C)$. Here, $f_G$ may represent a function applicable by compute node 710G to update $S_G$=current state information based on the delta input information. In the example in FIG. 8, since LS6 206 is no longer connected with T0-DR1 214, (SWITCH-ID=LS6, DOMAIN-ID=T0-DR1) may be replaced by (LS6, T1-DR2). This also applies to LS3 203. For newly deployed LS8 208, $\Delta S_G$ may identify the addition of (LS8, DOMAIN-ID=T0-DR1) based on its connection with T0-DR1 214.

Figure 9:
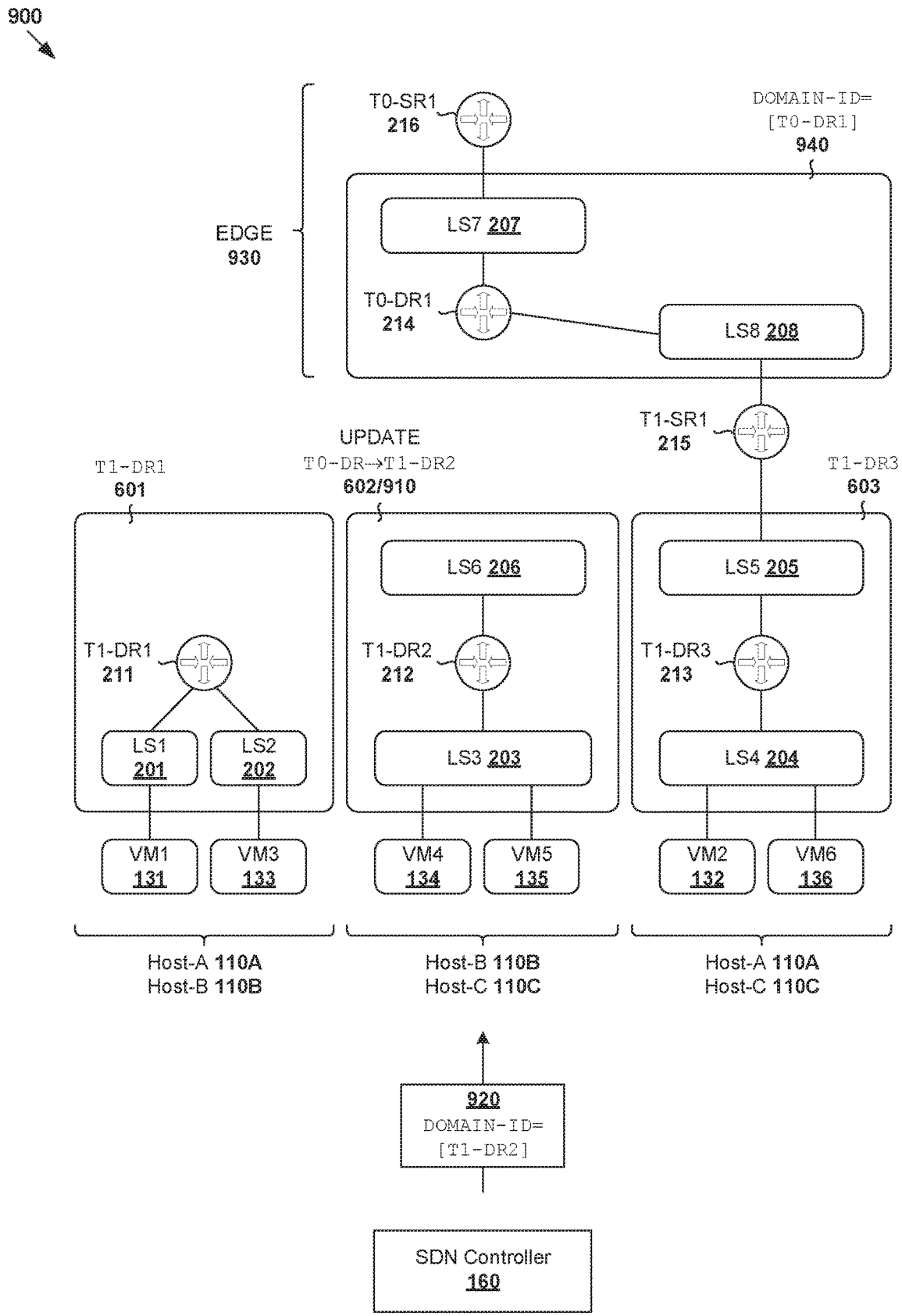
FIG. 9 is a schematic diagram illustrating example routing domain IDs that are computed using the examples in FIGS. 7-8.

Once routing domain computation is updated incrementally, SDN controller 160 may use the updated routing domain ID in a communication with the relevant host(s) and/or edge appliance. Some examples are shown in FIG. 9, which is a schematic diagram illustrating example routing domain IDs that are computed using the examples in FIGS. 7-8. Compared to FIG. 6, the routing domain ID of second routing domain 602/910 has changed. In this case, at 920, SDN controller 160 may use updated DOMAIN-ID=T1-DR2 in a communication with host-B 110B and host-C 110C on which (LS3 203, T1-DR2 212, LS6 206) are instantiated. SDN controller 160 may also inform an edge appliance (see 930/104) that supports (LS7 207, T0-DR1 214, LS8 208) that belongs to a fourth routing domain (see 940) with DOMAIN-ID=T0-DR1.

Parallel Computation

In the above examples, at least some compute nodes may be configured to operate in parallel of each other. For example in FIG. 7, example compute nodes 710A-B (and corresponding 410A-B in FIG. 4) may determine their state change information independently and in parallel of each other to improve efficiency. This also applies to compute nodes 710C-D (and corresponding 410C-D in FIG. 4), which are dependent on ($\Delta S_A$, $\Delta S_B$) but independent of each other. Further, compute nodes 710F-G (and corresponding 410F-G in FIG. 4) may also operate to determine respective $\Delta S_F$ and $\Delta S_G$ in parallel. In general, any two compute nodes that have input information available to them may run in parallel.

Figure 10:
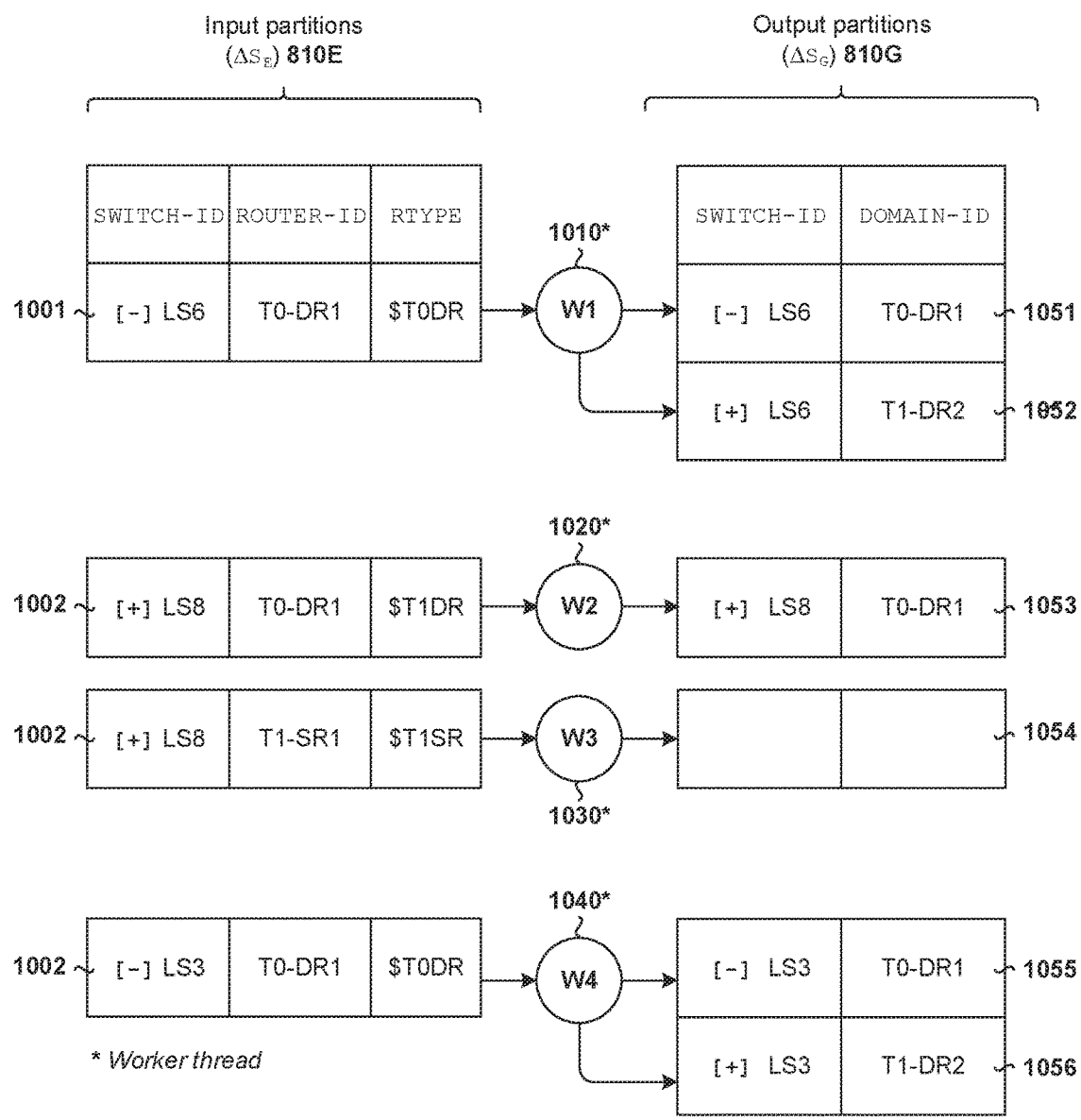
FIG. 10 is a schematic diagram illustrating parallel and incremental processing at a compute node for routing domain computation.

Depending on the desired implementation, routing computation at each compute node may be parallelized internally by partitioning its input information (e.g., using a hash function) and processing each partition using a separate worker thread. Some examples are shown in FIG. 10, which is a schematic diagram illustrating example parallel routing domain computation within a compute node. Using compute node 710G as an example, delta input=state change information ($\Delta S_E$) from node 710E may be divided into multiple partitions 1001-1004. For each partition, a hash value may be calculated to select one of multiple (K) worker threads to process the partition.

At 1001, a first partition identifying the deletion of (SWITCH-ID=LS6, ROUTER-ID=T0-DR1, RTYPE=$T0DR) may be processed using first worker thread (W1) 1010. The result is one partition of state change information ($\Delta S_G$) that identifies the replacement of (SWITCH-ID=LS6, DOMAIN-ID=T0-DR1) with (SWITCH-ID=LS6, DOMAIN-ID=T1-DR2). See also 1051-1052 in FIG. 10.

At 1002, a second partition=(SWITCH-ID=LS8, ROUTER-ID=T0-DR1, RTYPE=$T0DR) may be processed using second worker thread (W2) 1020. The result is one partition of state change information ($\Delta S_G$) that identifies the addition of (SWITCH-ID=LS8, DOMAIN-ID=T0-DR1). Similarly, at 1003, a third partition=(SWITCH-ID=LS8, ROUTER-ID=T0-SR1, RTYPE=$T0SR) may be processed using third worker thread (W3) 1030, which does not result in any new entry. See also 1053-1054 in FIG. 10.

At 1004, a fourth partition identifying the deletion of (SWITCH-ID=LS3, ROUTER-ID=T0-DR1, RTYPE=$T0DR) may be processed using fourth worker thread 1040. The result is one partition of state change information ($\Delta S_G$) that identifies the replacement of (SWITCH-ID=LS3, DOMAIN-ID=T0-DR1) with (SWITCH-ID=LS6, DOMAIN-ID=T1-DR2). See also 1055-1056 in FIG. 10.

Any suitable key or index may be used during the partitioning process to select a worker thread. For compute node 710E, the delta input information ($\Delta S_C$) from node 710C may be indexed by T1-ROUTER-ID while the delta input information ($\Delta S_D$) from node 710D may be indexed by ROUTER-ID. For compute nodes 710C-D, ($\Delta S_A$, $\Delta S_B$) may be indexed by ROUTER-ID. For compute node 710F, $\Delta S_C$ from node 710C may be indexed by T1-ROUTER-ID while $\Delta S_A$ from node 710A may be indexed by ROUTER-ID. For compute node 710G, delta input information ($\Delta S_B$, $\Delta S_E$) may be indexed by SWITCH-ID.

Container Implementation

Although explained using VMs 131-136, it should be understood that SDN environment 100 may include other virtual workloads, such as containers, etc. As used herein, the term "container" (also known as "container instance") is used generally to describe an application that is encapsulated with all its dependencies (e.g., binaries, libraries, etc.). For example, container technologies may be used to run various containers inside respective VMs 131-136. Containers are "OS-less", meaning that they do not include any OS that could weigh 10 s of Gigabytes (GB). This makes containers more lightweight, portable, efficient and suitable for delivery into an isolated OS environment. Running containers inside a VM (known as "containers-on-virtual-machine" approach) not only leverages the benefits of container technologies but also that of virtualization technologies. The containers may be executed as isolated processes inside respective VMs.

Computer System

The above examples can be implemented by hardware (including hardware logic circuitry), software or firmware or a combination thereof. The above examples may be implemented by any suitable computing device, computer system, etc. The computer system may include processor(s), memory unit(s) and physical NIC(s) that may communicate with each other via a communication bus, etc. The computer system may include a non-transitory computer-readable medium having stored thereon instructions or program code that, when executed by the processor, cause the processor to perform process(es) described herein with reference to FIG. 1 to FIG. 10. For example, the instructions or program code, when executed by the processor of the computer system, may cause the processor to perform routing domain computation according to examples of the present disclosure.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or other instructions to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described, or can be alternatively located in one or more devices different from that in the examples. The units in the examples described can be combined into one module or further divided into a plurality of sub-units.

We claim:

1. A method for routing domain computation for a logical network environment that includes multiple logical entities, the method comprising:

assigning multiple logical entities with respective routing domain identifiers (IDs) by processing network topology information specifying how the multiple logical entities are connected, wherein the processing is performed by at least one of multiple compute nodes;

in response to detecting a network topology change associated with a particular logical entity within the logical network environment, and based on the network topology change, determining first state change information identifying a first update to first state information maintained by a first compute node from the multiple compute nodes;

based on the first state change information, determining second state change information identifying a second update to second state information maintained by a second compute node from the multiple compute nodes;

assigning the particular logical entity with an updated routing domain ID based on at least one of: the first state change information and the second state change information; and using the updated routing domain ID in a communication between a manager and one or more hosts supporting the particular logical entity.

2. The method of claim 1, wherein determining the first state change information comprises:

based on the network topology change, identifying the first update that includes one or more of: (a) addition or removal of the particular logical entity; (b) modification of an attribute of the particular logical entity; and (c) addition or removal of a connection between the particular logical entity and another logical entity.

3. The method of claim 1, wherein determining the second state change information comprises:

based on the first state change information associated with a logical distributed router (DR), being the particular logical entity, identifying the second update that includes one or more of: (a) addition or removal of a path between a tier-1 logical distributed router and a tier-0 logical distributed router; and (b) addition or removal of a path between the logical DR and a logical switch.

4. The method of claim 3, wherein assigning the updated routing domain ID to the particular logical entity comprises:

assigning, using a third compute node from the multiple compute nodes, the updated routing domain ID to the logical DR, being the particular logical entity, by applying one or more rules based on the second update.

5. The method of claim 1, wherein determining the second state change information comprises:

based on the first state change information associated with a logical switch, being the particular logical entity, identifying one or more second updates that include: (a) addition or removal of a path between the logical switch and a logical DR; and (b) modification of an attribute of a logical DR connected with the logical switch.

6. The method of claim 5, wherein assigning the updated routing domain ID to the particular logical entity comprises:

assigning, using a third compute node from the multiple compute nodes, the updated routing domain ID to the logical switch, being the particular logical entity, by applying one or more rules based on the second update.

7. The method of claim 1, wherein determining the second state change information comprises:

partitioning the first state change information into multiple partitions; and assigning the multiple partitions to respective worker threads to each determine one partition of the second state change information.

8. A non-transitory computer-readable storage medium that includes a set of instructions which, in response to execution by a processor of a computer system, cause the processor to perform routing domain computation for a logical network environment that includes multiple logical entities, wherein the method comprises:

assigning multiple logical entities with respective routing domain identifiers (IDs) by processing network topology information specifying how the multiple logical entities are connected, wherein the processing is performed by at least one of multiple compute nodes;

in response to detecting a network topology change associated with a particular logical entity within the logical network environment, and based on the network topology change, determining first state change information identifying a first update to first state information maintained by a first compute node from the multiple compute nodes;

based on the first state change information, determining second state change information identifying a second update to second state information maintained by a second compute node from the multiple compute nodes;

assigning the particular logical entity with an updated routing domain ID based on at least one of: the first state change information and the second state change information; and using the updated routing domain ID in a communication between a manager and one or more hosts supporting the particular logical entity.

9. The non-transitory computer-readable storage medium of claim 8, wherein determining the first state change information comprises:

based on the network topology change, identifying the first update that includes one or more of: (a) addition or removal of the particular logical entity; (b) modification of an attribute of the particular logical entity; and (c) addition or removal of a connection between the particular logical entity and another logical entity.

10. The non-transitory computer-readable storage medium of claim 8, wherein determining the second state change information comprises:

based on the first state change information associated with a logical distributed router (DR), being the particular logical entity, identifying the second update that includes one or more of: (a) addition or removal of a path between a tier-1 logical distributed router and a tier-0 logical distributed router; and (b) addition or removal of a path between the logical DR and a logical switch.

11. The non-transitory computer-readable storage medium of claim 10, wherein assigning the updated routing domain ID to the particular logical entity comprises:

assigning, using a third compute node from the multiple compute nodes, the updated routing domain ID to the logical DR, being the particular logical entity, by applying one or more rules based on the second update.

12. The non-transitory computer-readable storage medium of claim 8, wherein determining the second state change information comprises:

based on the first state change information associated with a logical switch, being the particular logical entity, identifying one or more second updates that include: (a) addition or removal of a path between the logical switch and a logical DR;

and (b) modification of an attribute of a logical DR connected with the logical switch.

13. The non-transitory computer-readable storage medium of claim 12, wherein assigning the updated routing domain ID to the particular logical entity comprises:

assigning, using a third compute node from the multiple compute nodes, the updated routing domain ID to the logical switch, being the particular logical entity, by applying one or more rules based on the second update.

14. The non-transitory computer-readable storage medium of claim 8, wherein determining the second state change information comprises:

partitioning the first state change information into multiple partitions; and
assigning the multiple partitions to respective worker threads to each determine one partition of the second state change information.

15. A computer system, comprising:
a processor; and
a non-transitory computer-readable medium having stored thereon instructions that, in response to execution by the processor, cause the processor to perform:
assign multiple logical entities with respective routing domain identifiers (IDs) by processing network topology information specifying how the multiple logical entities are connected, wherein the processing is performed by at least one of multiple compute nodes; and
in response to detecting a network topology change associated with a particular logical entity within a logical network environment, and based on the network topology change, determine first state change information identifying a first update to first state information maintained by a first compute node from the multiple compute nodes;
based on the first state change information, determine second state change information identifying a second update to second state information maintained by a second compute node from the multiple compute nodes;
assign the particular logical entity with an updated routing domain ID based on at least one of: the first state change information and the second state change information; and
use the updated routing domain ID in a communication between a manager and one or more hosts supporting the particular logical entity.

16. The computer system of claim 15, wherein the instructions that cause the processor to determine the first state change information cause the processor to:
based on the network topology change, identify the first update that includes one or more of: (a) addition or removal of the particular logical entity; (b) modification of an attribute of the particular logical entity; and (c) addition or removal of a connection between the particular logical entity and another logical entity.

17. The computer system of claim 15, wherein the instructions that cause the processor to determine the second state change information cause the processor to:
based on the first state change information associated with a logical distributed router (DR), being the particular logical entity, identify the second update that includes one or more of: (a) addition or removal of a path between a tier-1 logical distributed router and a tier-0 logical distributed router; and (b) addition or removal of a path between the logical DR and a logical switch.

18. The computer system of claim 17, wherein the instructions that cause the processor to assign the updated routing domain ID to the particular logical entity cause the processor to:
assign, using a third compute node from the multiple compute nodes, the updated routing domain ID to the logical DR, being the particular logical entity, by applying one or more rules based on the second update.

19. The computer system of claim 15, wherein the instructions that cause the processor to determine the second state change information cause the processor to:
based on the first state change information associated with a logical switch, being the particular logical entity, identify one or more of second updates that include: (a) addition or removal of a path between the logical switch and a logical DR; and (b) modification of an attribute of a logical DR connected with the logical switch.

20. The computer system of claim 19, wherein the instructions that cause the processor to assign the updated routing domain ID to the particular logical entity cause the processor to:
assign, using a third compute node from the multiple compute nodes, the updated routing domain ID to the logical switch, being the particular logical entity, by applying one or more rules based on the second update.

21. The computer system of claim 15, wherein the instructions that cause the processor to determine the second state change information cause the processor to:
partition the first state change information into multiple partitions; and
assign the multiple partitions to respective worker threads to each determine one partition of the second state change information.

* * * * *